(12) United States Patent
Kirchhoff et al.

(10) Patent No.: US 9,487,635 B2
(45) Date of Patent: Nov. 8, 2016

(54) DEGASSING METHOD, DEGASSING DEVICE AND USE OF SCREW ELEMENTS

(71) Applicant: LANXESS Deutschland GmbH, Cologne (DE)

(72) Inventors: Joerg Kirchhoff, Cologne (DE); Thomas Koenig, Leverkusen (DE); Michael Bierdel, Cologne (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 0 days.

(21) Appl. No.: 14/342,666

(22) PCT Filed: Sep. 28, 2012

(86) PCT No.: PCT/EP2012/069201
§ 371 (c)(1),
(2) Date: Mar. 4, 2014

(87) PCT Pub. No.: WO2013/045623
PCT Pub. Date: Apr. 4, 2013

(65) Prior Publication Data
US 2015/0218335 A1    Aug. 6, 2015

(30) Foreign Application Priority Data

Sep. 28, 2011   (EP) .................................... 11007893

(51) Int. Cl.
*B29B 7/84*       (2006.01)
*C08J 11/10*      (2006.01)
(Continued)

(52) U.S. Cl.
CPC ............ *C08J 11/10* (2013.01); *B01F 7/00416* (2013.01); *B01F 15/0294* (2013.01); *B29B 7/845* (2013.01); *B29C 47/0861* (2013.01); *B29C 47/6025* (2013.01); *B29C 47/6031* (2013.01); *B29C 47/6056* (2013.01); *B29C 47/6075* (2013.01); *B29C 47/64* (2013.01); *B29C 47/767* (2013.01); *B01F 2215/0049* (2013.01); *B29C 47/0011* (2013.01); *B29C 47/0813* (2013.01); *B29C 47/0825* (2013.01); *B29C 47/0845* (2013.01); *B29C 47/0869* (2013.01);
(Continued)

(58) Field of Classification Search
CPC ........................................................ B29B 7/845
USPC ................................................ 366/75, 84, 85
See application file for complete search history.

(56) References Cited

U.S. PATENT DOCUMENTS 3,254,367 A    6/1966   Erdmenger
3,501,807 A    3/1970   Selbach
(Continued)

FOREIGN PATENT DOCUMENTS

DE    3431063 A1    3/1985
EP    1127609 A2    8/2001
JP    59048136 A    3/1984

OTHER PUBLICATIONS

Hagberg, C. "Comparison of solution rubber finishing processes—part 1", Process Machinery, Mar. 2000, pp. 17-23.
(Continued)

*Primary Examiner* — David Sorkin

(57) ABSTRACT

The present invention relates to a process for devolatilizing polymer-containing media such as, in particular, polymer melts, polymer solutions and dispersions and also devolatilisation apparatuses for carrying out the abovementioned process.

18 Claims, 6 Drawing Sheets

(51) Int. Cl.
- *B29C 47/60* (2006.01)
- *B29C 47/64* (2006.01)
- *B01F 7/00* (2006.01)
- *B01F 15/02* (2006.01)
- *B29C 47/00* (2006.01)
- *B29C 47/08* (2006.01)
- *B29C 47/36* (2006.01)
- *B29C 47/38* (2006.01)
- *B29C 47/40* (2006.01)
- *B29C 47/62* (2006.01)
- *B29C 47/76* (2006.01)
- *B29K 23/00* (2006.01)

(52) U.S. Cl.
CPC ......... *B29C47/0871* (2013.01); *B29C 47/366* (2013.01); *B29C 47/38* (2013.01); *B29C 47/402* (2013.01); *B29C 47/62* (2013.01); *B29C 47/762* (2013.01); *B29C 47/763* (2013.01); *B29K 2023/22* (2013.01); *C08J 2315/02* (2013.01)

(56) References Cited

U.S. PATENT DOCUMENTS

| | | |
|---|---|---|
| 4,055,001 A | 10/1977 | Forster et al. |
| 5,487,602 A * | 1/1996 | Valsamis ............... B29B 7/465 366/81 |
| 6,024,479 A | 2/2000 | Haring |
| 6,811,294 B1 | 11/2004 | Elsner et al. |
| 8,388,216 B2 | 3/2013 | Lechner et al. |
| 2001/0056176 A1 | 12/2001 | Takami et al. |
| 2006/0245294 A1 | 11/2006 | Burkhardt |
| 2007/0211560 A1* | 9/2007 | Takamoto ............... B29B 7/483 366/82 |
| 2011/0158039 A1 | 6/2011 | Bierdel et al. |
| 2011/0184089 A1 | 7/2011 | Bierdel et al. |
| 2012/0043687 A1 | 2/2012 | Kirchhoff et al. |
| 2012/0182823 A1 | 7/2012 | Burkhardt |

OTHER PUBLICATIONS

Hagberg, C. "Comparison of solution rubber finishing processes—part II", Process Machinery, Mar. 2000, pp. 28-30.
Hanser Verlag Munich, 2007, "Twin Screw Extruders" 1, pp. 192-212.

* cited by examiner

DEGASSING METHOD, DEGASSING DEVICE AND USE OF SCREW ELEMENTS

The present invention relates to a process for devolatilising polymer-containing media such as, in particular, polymer melts, polymer solutions and dispersions and also devolatilisation apparatuses for carrying out the abovementioned process.

Extrusion is a frequently employed process in the preparation, treatment and processing of polymers. Here and in the following, extrusion is the treatment of a medium in a single-screw or multiscrew extruder.

In the preparation of polymers, extrusion is employed industrially for removing volatile constituents such as monomers, oligomers and also auxiliaries and solvents from polymer-containing media ([1], p. 192 to 212; [1]=Klemens Kohlgrüber. Twin-Screw Extruders, Hanser Verlag Munich 2007). Furthermore, chemical modification of the polymer, e.g. by grafting, modification of functional groups or modification of the molecular weight by targeted increase or decrease of the molecular weight can optionally also be carried out during extrusion or the polymer can, for example, be finished by mixing in of additives.

The advantages of extrusion are offset by the disadvantage that a particularly large amount of energy is dissipated in the polymer-containing media to be extruded, especially in the intermesh zones of the screw elements typically used as treatment element in the extruders, which can lead to severe local overheating. This local overheating can lead to damage to the product, e.g. change of odour, colour, chemical composition, or to formation of inhomogeneities in the product, e.g. gel particles or specks.

Damage patterns in various polymers in the case of local overheating are, for example, described in WO2009/153000 A on p. 22, line 7 to p. 24, line 25.

Rubbers such as polybutadiene (BR), natural rubber (NR), polyisoprene (IR), butyl rubber (IIR), chlorobutyl rubber (CIIR), bromobutyl rubber (BIIR), styrene-butadiene rubber (SBR), polychloroprene (CR), butadiene-acrylonitrile rubber (NBR), partially hydrogenated butadiene-acrylonitrile rubber (HNBR) and ethylene-propylene-diene copolymers (EPDM), in particular, tend to display crosslinking and gel formation if the temperature is too high, which leads to a severe deterioration in mechanical properties of the products produced therefrom. In the case of chlorobutyl and bromobutyl rubber and also chloroprene rubbers, corrosive hydrogen chloride or hydrogen bromide can be liberated at elevated temperature and this in turn catalyzes the further decomposition of the polymer.

The reaction rate at which damage to the polymer proceeds depends on the temperature and the reaction rate constant k(T) for this can be described by the Arrhenius equation:

$$k(T)=A*\exp(-E_A/(R*T)).$$

In this equation, k is the reaction rate constant, T is the absolute temperatuer in [K], A is the frequency factor, $E_A$ is the activation energy in [J/mol] and R is the universal gas constant in [J/(mol*K)].

Processes for the extrusion of polymer-containing media should therefore generally be configured, also from an energy point of view, so that the average temperature increase is as low as possible and local temperature peaks as occur, for example, in the intermesh zones of a screw element having a classical Erdmenger screw profile according to the prior art, are avoided.

The prior art contains a large number of approaches to solving this problem.

DE 1 180 718 A discloses a twin-screw machine having single-flighted treatment or screw elements. In cross section, the outer contour of the screw elements is made up of circular arcs. The active flank in the direction of rotation has an outer contour which is made up of three circular arcs whose midpoints are located either on the outer radius or on the longitudinal axis of the screw elements. A disadvantage is that the screw elements allow only a small flexibility in the setting of the shearing and/or elongating flows acting on the material to be processed.

WO2009/152968 and WO2011/039016 disclose treatment elements for extruders, in particular screw elements, which due to their rounded shape cause less energy input into polymer-containing media during extrusion.

EP 1 617 985 A1 discloses a treatment plant and also a process for devolatilising bimodal polyolefins. In the treatment plant, two corotating twin-screw extruders are arranged in series and the second extruder viewed in the transport direction has a devolatilisation zone for devolatilising the polyolefins to be treated. A disadvantage of this treatment plant is that the devolatilisation performance, i.e. the proportion of undesirable volatile constituents which is removed, is low.

EP 0861717 A1 discloses a process and an apparatus for processing materials which give off a large amount of volatiles. The extrusion apparatus has a main extruder and two secondary extruders which open laterally into this, so that the gas stream formed in a vaporisation zone of the main extruder is divided into at least three substreams which are then discharged from the extruders.

EP 1 127 609 A2 discloses a process for removing volatile constituents from a polymer-containing medium using a kneader. Here, the energy is partly introduced through the wall of the kneader and used for vaporising the solvent. Furthermore, energy is introduced as mechanical energy by means of the rotating screw of the kneader. The introduction of mechanical energy via the kneader depends greatly on the viscosity of the product, which greatly reduces the flexibility and thus attractiveness of the process for industrial use.

EP 1 165 302 A1 discloses an apparatus and a process for devolatilising plastics, which has a backward-devolatilisation zone and a plurality of devolatilisation zones in the transport direction, which are operated under reduced pressure. The reduced pressure is necessary in order to achieve low residual concentrations of volatile constituents.

"Process Machinery", parts I and II, March and April 2000; author: C. G. Hagberg, and WO2010/031823 A and PCT/EP2011/054415 disclose the direct devolatilisation of rubber solutions using a flash tank and one or more extruders.

U.S. Pat. No. 4,055,001 discloses a process for preparing polymers such as butyl rubber having a water content of less than 0.1% by weight using ultrasonic probes during the drying process. However, the very high shear stress produced by ultrasound is unfavourable for industrial use.

US 2001/056176 A1 discloses a single-stage process for concentrating rubber solutions. The rubber solution is heated by means of steam in order to remove solvents present in one step by devolatilisation under reduced pressure, producing white crumbs. US 2001/056176 A1 recommends a large-volume stream of steam to remove volatile components at a low vapour pressure and leads to undesirable inclusion of additional water in the crumbs.

However, the abovementioned approaches to solving the problem for the extrusion of polymer-containing media, in particular rubber-containing media, are still capable of improvement.

It was therefore an object of the invention to provide a process for removing volatile constituents from polymer-containing media, which makes possible a high devolatilisation performance combined with a high polymer throughput together with a low residual content of volatile constituents.

The invention then provides an apparatus which is particularly suitable for removing volatile compounds from polymer-containing media and has at least one extruder which in turn has:

a barrel and n barrel holes $B_n$ having the associated hole diameters $D_n$ where n is an integer, preferably an integer from 1 to 16, particularly preferably from 1 to 12, very particularly preferably from 2 to 8 and even more preferably 2, and the barrel holes in the case of n being greater than 1 preferably pass through opposite one another and are likewise preferably arranged parallel to one another, one or more screws $W_n$ which can be driven so as to rotate and are in each case arranged concentrically in one of the barrel holes $B_n$, have an axis of rotation $A_n$ and are equipped with treatment elements whose cross-sectional profile in the circumferential direction has m relative maxima $R^m_{max\ n}$ in respect of the radial dimension of the cross-sectional profile to the axis of rotation $A_n$ of the screw $W_n$, where m is an integer from 1 to 8, preferably from 1 to 4, particularly preferably 1, 2 or 3, very particularly preferably 1 or 2 and even more preferably 2, a maximum value $R_{max\ n}$ in respect of the radial dimension of the cross-sectional profile to the axis of rotation $A_n$ of the screw $W_n$, where $R_{max\ n}$ fulfils:

$$R_{max\ n} <= (D_n/2)$$

at least one feed zone, one or more devolatilisation zones comprising in each case at least one devolatilisation opening which is suitable for discharge of volatile constituents from a polymer-containing medium from the extruder, at least one discharge zone, where the extruder has screw elements having a pitch t as treatment elements, which are configured so that at least two of the following three conditions are met:

S1) the cross-sectional profile has at least one relative maximum $R^m_{max\ n}$ based on the radial dimension of the profile curve, for which:
0.420 $D_n < R^m_{max\ n} < 0.490\ D_n$, preferably 0.430 $D_n >= R^m_{max\ n}, <0.485\ D_n$, particularly preferably 0.440 $D_n < R^m_{max\ n}, <0.482\ D_n$ and particularly preferably 0.450 $D_n < R^m_{max\ n} < 0.480\ D_n$, S2) 1.38 $D_n < t < 5.00\ D_n$, preferably 1.60 $D_n < t < 3.00\ D_n$, particularly preferably 1.80 $D_n < t < 2.50\ D_n$ and very particularly preferably 1.90 $D_n < t < 2.40\ D_n$, S3) the cross-sectional profile of the respective screw element has no tangential angle β greater than 30°, preferably greater than 25°, particularly preferably 22°, very particularly preferably 15° and very particularly preferably 10°, on the active flanks located at the front in the direction of rotation in the range of the radial dimension from 0.95 $R_{max}$ to $R_{max}$, preferably from 0.90 $R_{max}$ to $R_{max}$, particularly preferably from 0.80 $R_{max}$ to $R_{max}$, very particularly preferably from 0.50 $R_{max}$, to $R_{max}$ and even more preferably in the entire range from 0 to $R_{max}$, where the tangential angle β is defined as the smaller of the two angles formed on drawing the tangents at any point on the cross-sectional profile of the treatment element at which the cross-sectional profile cannot be continually differentiated and is 0° at any point on the cross-sectional profile of the treatment element at which the cross-sectional profile can always be differentiated.

The scope of the invention encompasses not only the features and combinations of features which are explicitly mentioned but also any combinations of preferred ranges which are specified for each feature.

For the purposes of the invention, the cross-sectional profile is the profile of a treatment element, in particular a screw element, in a plane orthogonal to the axis of rotation $A_n$ of the screw on which the treatment element is arranged.

The term screw elements encompasses both the modular construction which is nowadays customary comprising a core shaft and screw elements which have an accommodation opening for the core shafts and also screws having a solid construction, e.g. in one-piece form, screws which consist of individual subsegments which are produced in solid construction, or combinations of the abovementioned constructions.

The abovementioned geometric ratios are described by means of a classical two-flighted Erdmenger profile for a tightly intermeshing twin-screw extruder, as is shown in FIG. 1. The Erdmenger profile has, for example, two relative maxima $R^1_{max}$ and $R^2_{max}$ in the region of intermeshing of the screws which in each case have the maximum value $R_{max}$ in respect of the radial dimension of the cross-sectional profile to the axes of rotation A1 and A2.

In the literature, screw elements which have p relative maxima $R^p_{max}$ which are each at least 85%, preferably at least 95%, of the maximum value $R_{max}$ in respect of the radial dimension of the cross-sectional profile to the axis of rotation $A_n$ of the screw $W_n$ are generally also referred to as p-flighted screw profile.

The active flanks located at the front in the direction of rotation are for the purposes of the present invention those regions of the cross-sectional profile of the screw elements from a relative maximum $R^m_{max\ n}$ to the next relative minimum $R^m_{min\ n}$ in respect of the radial dimension of the cross-sectional profile to the axis of rotation $A_n$ of the screw $W_n$ in the direction of rotation. If the relative maximum $R^m_{max\ n}$ or the relative minimum $R^m_{min\ n}$ is a single point, this is by definition neither a constituent of the active flank ($F_{akt}$) nor of the passive flank $F_{pass}$. The same applies to the midpoint M of an intermesh region which has, for example, a plateau-like relative maximum in respect of the function R(φ) of the screw profile, where φ is the angle in the circumferential direction to the axis of rotation A, over an intermesh angle KW. In this case, as shown in FIG. 1, the region from the midpoint of the plateau-like maximum to the end point of the relative maximum in the direction of rotation of the screw element is by definition likewise part of the active flank $F_{akt}$. The end point of the relative maximum in the direction of rotation of the screw element is the point of the intersection Sp in the Erdmenger profile shown in FIG. 1.

Furthermore, the radius 0.9 $R_{max}$, is indicated by way of example in FIG. 1, from which it can be seen that the intersection point Sp of the intermesh circular arc and the flank circular arc is located outside this radius, i.e. between 0.9 $R_{max}$, and $R_{max}$, and produces a kink in the profile which generates an edge on the screw element. The tangents T1 of the intermesh circular arc and T2 of the flank circular arc and also the smaller angle β enclosed by the tangents T1 and T2, which for the Erdmenger profile shown is about 34°, are likewise shown in FIG. 1.

The Erdmenger profile shown therefore does not satisfy feature S3).

The feature S1) is also described as radial play in the literature.

According to the invention, polymer-containing media are media which comprise at least one polymer and at least one volatile compound.

Polymers can be natural or synthetic polymers, preferably ones having a weight average molecular weight of more than 2000 g/mol, particularly preferably more than 5000 g/mol.

Examples of natural and synthetic polymers encompass thermoplastic polymers such as polycarbonates, polyamides, polyesters, in particular polybutylene terephthalate and polyethylene terephthalate, polylactides, polyethers, thermoplastic polyurethanes, polyacetals, fluoro polymers, in particular polyvinylidene fluoride, polyether sulphones, polyolefins, in particular polyethylene and polypropylene, polyimides, polyacrylates, in particular poly(methyl) methacrylate, polyphenylene oxide, polyphenylene sulphide, polyether ketone, polyaryl ether ketone, styrene polymers, in particular polystyrene, styrene copolymers, in particular styrene-acrylonitrile copolymer, acrylonitrile-butadiene-styrene block copolymers, and polyvinyl chloride and also elastomers such as rubbers from the group consisting of styrene-butadiene rubbers, natural rubbers, butadiene rubbers, isoprene rubbers, ethylene-propylene-diene rubbers such as ethylene-propylene-diene (M class) rubbers (EPDM), ethylene-propylene rubbers, butadiene-acrylonitrile rubbers, hydrogenated nitrile rubbers, butyl rubbers, halobutyl rubbers, chloroprene rubbers, ethylene-vinyl acetate rubbers, polyurethane rubbers, guttapercha, fluoro rubbers, silicone rubbers, sulphide rubbers, chlorosulphonyl-polyethylene rubbers and also any mixtures of the abovementioned thermoplastic polymers and elastomers.

In the context of the present invention, the term butyl rubber refers, in particular, to a copolymer of isobutene (2-methylpropene) and isoprene (2-methylbuta-1,3-diene). On a molar basis, the isoprene content of the polymer is in the range from 0.001 to 5%, preferably from 1.8 to 2.3 mol %. Butyl rubber consists of linear polyisobutene chains with randomly distributed isoprene units. The isoprene units introduce unsaturated positions into the polymer chain, which makes vulcanisation possible. The mass average molecular weight of butyl rubber Mw is usually in the range from 50 000 to 1 000 000 g/mol, preferably from 300 000 to 1 000 000 g/mol.

Halogenated butyl rubbers additionally contain a certain amount of halogen which is chemically bound to the polymer. The amount of chemically bound halogen is usually in the range from >0 to 3% by weight based on the total mass of the polymer. The (halo)butyl rubbers can also contain additives, e.g. from 0.0001 to 4 phr (phr=parts per hundred parts of rubber based on the weight of the rubber), of epoxidised soybean oil (ESBO), from 0.0001 to 5 phr of calcium stearate and from 0.0001 to 0.5 phr of antioxidants. Other additives can likewise be employed, depending on the use of the butyl rubber product, i.e. fillers or colorants.

In the case of bromobutyl rubber, the typical bromine content in the finished product is from 1.5 to 2.5% by weight, preferably from 1.6 to 2.0% by weight.

In the case of chlorobutyl rubber, the typical chlorine content in the finished product is from 1.0 to 1.5% by weight, preferably from 1.15 to 1.35% by weight.

The polymer-containing media to be used according to the invention can, for example, be in the form of suspensions, pastes, melts, solutions, particulate solid compositions or mixed forms of the abovementioned types.

For the purposes of the present invention, the term "volatile compounds" refers to compounds having a boiling point below 250° C. at a pressure of 1013 hPa. Volatile compounds are, in particular, water and other volatile inorganic compounds and also volatile, organic compounds. Volatile organic compounds are typically solvents which are used in the polymerisation or in subsequent processing steps, monomers or oligomers which, for example, originate from the polymerisation process of other organic compounds such as additives.

The extruder preferably has a barrel and n=1 to 16, particularly preferably n=1 to 12, very particularly preferably n=2 to 8 and even more preferably n=2, barrel holes $B_n$.

When n is greater than 1, the barrel holes $B_n$ preferably pass through opposite one another and are likewise preferably arranged parallel to one another. Embodiments in which n is greater than 1 and the barrel holes do not pass through and are preferably parallel comprise a possible embodiment of the invention.

Types of extruder which are suitable for the purposes of the invention thus encompass single-screw and multiscrew extruders, for example twin-screw extruders or ring extruders, with twin-screw extruders being preferred. Twin-screw extruders can be driven in a contrarotating or corotating manner. Preference is given to multiscrew extruders such as, in particular, twin-screw extruders or ring extruders equipped with close-intermeshing treatment elements, in particular self-cleaning screw elements. Multiscrew extruders can also be extruders having extruder screws or treatment elements which do not intermesh and do not come into contact with one another.

In one embodiment, the at least one extruder of the devolatilisation apparatus also has at least one dispersing zone. In the dispersing zone, it is possible, for example, for stripping agents or other additives to be introduced into the polymer. The treatment elements of the dispersing zone can, for example, be kneading elements, toothed blocks, toothed discs or toothed mixing elements. A possible further selection of suitable elements may be found in [1].

In the region of the active flank of a screw element, the polymer-containing medium to be extruded is pressed into an ever narrower wedge in the barrel hole $B_n$ of the extruder screw $W_n$ on rotation of the extruder screw $W_n$. Shearing and elongating flows occur here and lead, particularly in the case of devolatilisation according to the invention, to a high degree of surface renewal and thus to improved diffusion of volatile constituents from the polymer-containing medium.

It has surprisingly been found that the throughput and devolatilisation performance of extruders can be improved significantly when screw elements which conform to two of the features S1), S2) and S3), for example S1) and S2) or S2) and S3) or S1) and S3), or preferably all three of the features S1), S2) and S3) are present as treatment elements in the extruder.

In an embodiment, the features S1) and S2) or all three features S1), S2) and S3) are satisfied.

It has been found that screw elements which satisfy the above-described combinations of the features S1), S2) and S3) keep the energy input so low that the above-described damage to the extruded polymers can be largely or completely avoided despite a high devolatilisation performance. This effect is then fully utilized, in particular, when the screw elements having the abovementioned features are used in at least one devolatilisation zone. Preference is given to at least the last devolatilisation zone of the extruder being equipped with corresponding screw elements. In a further embodiment, all devolatilisation zones of the extruder are equipped with corresponding screw elements. The number of devolatilisation zones is in principle not subject to any restrictions and can be, for example, from 1 to 20, preferably from 1 to 10 and particularly preferably from 2 to 8. The devolatilisation zones are typically downstream of the feed zone of the extruder, the arrangement of at least one devolatilisation zone upstream of the feed zone of the extruder (referred to as backwards devolatilisation zone) is preferred.

Devolatilisation zones typically have, as is known to those skilled in the art, at least one devolatilisation opening in the extruder barrel which open(s) into devolatilisation domes which are in turn connected via gas discharge lines to a condenser unit in which the volatile compounds given off from the polymer-containing media are condensed. The pressure in the devolatilisation zones for the devolatilisation domes is preferably regulated by means of pumps, in particular vacuum pumps.

The volatile compounds given off from the polymer-containing medium via the devolatilisation openings and the devolatilisation domes tend to carry polymers or products with them, which in the worst case can lead to blockage of the devolatilisation openings and of the devolatilisation domes.

The devolatilisation openings and the devolatilisation domes are, in a preferred embodiment of the invention, therefore configured so that they effectively prevent or reduce exit of polymer-containing medium or product.

Suitable means for achieving this are single-screw or multiscrew, in particular twin-screw, stopping screws which are mounted on the devolatilisation openings and are operated so as to transport into the extruder or rollers or belts which are arranged on the inside of the devolatilisation openings in order to push polymer-containing medium or product back into the extruder. As an alternative to or in addition to the abovementioned means, it is possible to use coatings on the devolatilisation openings which reduce or prevent adhesion of the material to the surface. Suitable coatings are, for example, DLC (diamond-like carbon), ethylene-tetrafluoroethylene (ETFE), polytetrafluoroethylene (PTFE) and nickel alloys.

The pressure in the devolatilisation openings and devolatilisation domes is, for example, in the range from 1 hPa and 2000 hPa, preferably from 5 hPa to 900 hPa.

If a plurality of devolatilisation zones are arranged downstream of the feed zone of the extruder, it is necessary to install pressure buildup zones and preferably additionally banking-up elements between the individual devolatilization zones in order to seal off the individual devolatilisation zones from one another and thus allow progressive degassing in the transport direction of the extruder. In this case, the devolatilisation zones can be operated at different pressures, in particular at pressures which typically become lower in the transport direction of the extruder.

While devolatilisation zones are typically partly filled zones having a volumetric degree of fill of from about 0.1 to 0.6, preferably from 0.3 to 0.5, a volumetric degree of fill of 1 is achieved in the pressure buildup zones and optionally at the banking-up element. These are then referred to as fully filled zones or sections.

As treatment elements in the pressure buildup zones, it is possible to use, for example, conventional screw elements having a smaller pitch t than in the devolatilisation zones.

As banking-up elements, it is possible to use, for example, backwards-transporting elements, forwards-transporting elements having a small pitch, kneading blocks, banking-up discs, toothed mixing elements or elements in general having a low transport volume.

The extruder can, for example, also have at least one dispersing zone, for example in order to introduce stripping agents or other additives into the polymercontaining medium. It has surprisingly been found that the dispersion in the extruder functions particularly well when the at least one dispersing zone has, as treatment elements, screw elements which have a pitch t and are configured so that at least two of the three following conditions are satisfied:

S1) having the abovementioned values including the preferred ranges for these

S3) having the abovementioned values including the preferred ranges for these

S4) $1.50\,D_n < t < 12.00\,D_n$, preferably $1.60\,D_n < t < 10.00\,D_n$ and particularly preferably $2.00\,D_n < t < 9.00$.

If stripping agents are to be introduced into the polymer-containing medium to promote devolatilisation, the dispersion zones are preferably arranged upstream of the devolatilisation zones of the extruder.

In one embodiment, the devolatilisation zones are located upstream of at least some depressurisation elements.

Depressurisation elements can be, for example, rotating or fixed perforated plates.

Such perforated plates are known, for example, from JP 59 048136 A, U.S. Pat. No. 3,501,807, DE 34 31 063, DE 623 903 and PCT/EP2011/062636.

As depressurisation elements, it is also possible to use, for example, backwards conveying elements, forwards conveying elements having a very small pitch, kneading blocks or banking-up discs.

In a preferred embodiment, use is made of fixed perforated plates which in operation are fixed to but removable from the barrel and each have an accommodation opening for accommodation of each screw present in the extruder and preferably act as a sliding seal for the screws. The radial spacing s of the accommodation opening to the screw in relation to the barrel hole B is preferably such that $0.001 \le s/D \le 0.02$, preferably $0.002 \le s/D \le 0.01$ and particularly preferably $0.003 \le s/D \le 0.006$.

The perforated plates have one or more, preferably a large number, of holes, where the holes have a diameter d of, for example, from $1\,mm \le d \le 6\,mm$, preferably $1.5\,mm \le d \le 5\,mm$ and particularly preferably $2\,mm \le d \le 4\,mm$.

In a likewise preferred embodiment, the perforated plates are made up of a plurality of parts, preferably two parts, so that they can be taken from the barrel without removal of the screws.

The particular advantage of the use of perforated plates is that the polymer-containing medium passed through the perforated plates is in the form of strands in the subsequent free space of the devolatilisation zone and has a larger surface area compared to the polymer-containing medium upstream of the die plate. As a result, volatile compounds can easily leave the polymer-containing medium and be separated from the latter.

In general, the extruder can comprise one or more feed openings for the introduction of additives, and these can in principle be positioned everywhere in the extruder, preferably outside the devolatilisation zones and preferably in the dispersing zones, if present.

Examples of additives which can be introduced via the feed openings, in particular for (halo)butyl rubber products encompass stabilizers, acid scavengers such as ESBO (epoxidized soybean oil), stearates such as calcium stearate, antioxidants and the like. Examples of suitable antioxidants contain sterically hindered phenols such as butylhydroxytoluenes and derivatives thereof, e.g. Irganox 1010 and 1076, amines, mercaptobenzimidazoles, certain phosphites and the like.

As an alternative or in addition, the additives can also be introduced into the polymeric medium PM before entry into the devolatilisation apparatus or, if they are liquid, with the stripping agents in the extruder.

Screw elements which can satisfy feature S3) are in principle known from, for example, WO2009/152968 A and WO2011/039016 A.

According to the invention, preference is given to using screw elements whose cross-sectional profile can be represented completely by a profile curve which can continually be differentiated. Such cross-sectional profiles are preferably two-flighted or three-flighted. The cross-sectional profile of such screw elements will hereinafter also be referred to as screw profiles.

Particular preference is given to using abovementioned screw elements in close-intermeshing multiscrew extruders such as, in particular, twin-screw extruders, preferably corotating twin-screw extruders.

The cross-sectional profiles of such screw elements can be unambiguously described by an arrangement of circular arcs and in their totality are composed of n circular arcs, where n is greater than or equal to four. Each of the n circular arcs has a starting point and an end point. The n circular arcs go tangentially into one another at their starting points and end points, so that together they form a profile curve which can be continually differentiated.

The position of each circular arc j (j=1 to n) can be fixed unambiguously by the reporting of two different points. The position of each circular arc is advantageously fixed by indication of the midpoint and the starting point or end point. The size of an individual circular arc j is fixed by the radius $r_j$ and the angle $a_j$ at the midpoint between starting point and end point, where the radius $r_j$ is greater than 0 and less than the spacing a between the axes of the screws and the angle $a_j$ in radians is greater than or equal to 0 and less than or equal to 2p; where p is the number pi.

The abovementioned screw elements are characterized in that
the generating screw profile and the screw profile generated lie in one plane,
the axis of rotation of the generating screw profile and the axis of rotation of the screw profile generated are at a spacing a (axial spacing) in each case perpendicularly on said plane of the screw profiles, where the intersection of the axis of rotation of the generating screw profile with said plane is referred to as point of rotation of the generating screw profile and the intersection of the axis of rotation of the screw profile generated with said plane is referred to as point of rotation of the screw profile generated,
the number of circular arcs of the total generating screw profile n is greater than or equal to four (n>4),
the outer radius ra of the generating screw profile is greater than zero (ra>0) and less than the axial spacing (ra<a),
the core radius ri of the generating screw profile is greater than zero (ri>0) and less than or equal to ra (ri≤ra),
all circular arcs of the generating screw profile go into one another tangentially,
the circular arcs form a closed screw profile, i.e. the sum of the angles $a_j$ of all circular arcs j is equal to 2p; where p is the number pi,
the circular arcs form a convex screw profile,
each of the circular arcs of the generating screw profile is within or on the boundaries of an annulus which has the outer radius ra and the core radius ri and whose midpoint is on the point of rotation of the generating screw profile,
at least one of the circular arcs of the generating screw profile contacts the outer radius ra of the generating screw profile at a point $P_A$,
at least one of the circular arcs of the generating screw profile contacts the core radius ri of the generating screw profile at a point $P_I$ and the number of circular arcs n' of the screw profile generated is equal to the number of circular arcs n of the generating screw profile,
the outer radius ra' of the screw profile generated is equal to the difference between the axial spacing and core radius ri of the generating screw profile (ra'=a−ri),
the core radius ri' of the screw profile generated is equal to the difference between the axial spacing and outer radius ra of the generating screw profile (ri'=a−ra),
the angle $a_j'$ of the j'-th circular arc of the screw profile generated is equal to the angle $a_j$ of the j-th circular arc of the generating screw profile, where j and j' are integers which together go through all values in the range from 1 to the number of circular arcs n or n',
the sum of the radius r of the j'-th circular arc of the screw profile generated and the radius j of the j-th circular arc of the generating screw profile is equal to the axial spacing a, where j and j' are integers which together run through all values in the range from 1 to the number of circular arcs n or n',
the midpoint of the j'-th circular arc of the screw profile generated is at a spacing from the midpoint of the j-th circular arc of the generating screw profile which is equal to the axial spacing a and the midpoint of the j'-th circular arc of the screw profile generated is at a spacing from the point of rotation of the screw profile generated which is equal to the spacing of the midpoint of the j-th circular arc of the generating screw profile from the point of rotation of the generating screw profile and the connecting line between the midpoint of the j'-th circular arc of the screw profile generated and the midpoint of the j-th circular arc of the generating screw profile is parallel to a connecting line between the point of rotation of the screw profile generated and the point of rotation of the generating screw profile, where j and j' are integers which together run through all values in the range from 1 to the number of circular arcs n or n',
a starting point of the j'-th circular arc of the screw profile generated is in a direction based on the midpoint of the j'-th circular arc of the screw profile generated which is opposite to the direction which has a starting point of the j-th circular arc of the generating screw profile based on the midpoint of the j-th circular arc of the generating screw profile, where j and j' are integers which together run through all values in the range from 1 to the number of circular arcs n or n'.

The screw elements can be unsymmetrical or symmetrical, with preference being given to symmetrical screw elements. Symmetrical screw elements can be axially symmetric or point-symmetric; preference is given to axially symmetric screw elements according to the invention.

The generation of such cross-sectional profiles is described in detail in WO2009/152968 A and WO2009/153000 A and is thus known to those skilled in the art.

In another embodiment of the invention, screw elements whose cross-sectional profiles are hereinafter also referred to as outer contour and which satisfy the feature S3) and have
- a longitudinal axis M*,
- a core radius Rj and an outer radius $R_a$ which each have the longitudinal axis M* as midpoint,
- an outer contour $A(\phi)$ running around the longitudinal axis M*, where $\phi$ is the angle around the longitudinal axis M* and
- $R_j < D_A((p) < R_a$ for a spacing $D_A((p)$ of the outer contour $A(\phi)$ from the longitudinal axis M, and are further characterized in that
- the outer contour $A(\phi)$ has at least one outer contour section $A(\Delta\phi)$ which runs along an angular section $\Delta\phi$ and has a continually changing spacing $D_A(\Delta\phi)$ from the longitudinal axis M*, where $Rj < D_A(\Delta\phi) < R_a$, and has an associated evolute E,
- which is a number of n points P(i) where i=1 to n and n≥3,
- where each of the points P(i) is located outside the longitudinal axis M* and within the outer radius $R_a$, and
- each two adjacent points P(i) and P(i+1) have a spacing $\Delta r(i)$ from one another which is less than $R_j/2$, are used according to the invention.

The screw elements are preferably further characterized in that each two adjacent points P(i) and P(i+1) have a spacing $\Delta r(i)$ from one another which is less than $R_j/4$, in particular less than $R_j/6$ and in particular less than $R_j/8$, where the two adjacent points P(i) and P(i+1) belong to adjacent evolvent curves E'(i) and E'(i+1).

In another embodiment, the screw elements are characterized in that each two adjacent points P(i) and P(i+1) have a constant spacing Dr from one another and optionally also in that the evolvent curves E'(i) belonging to the points P(i) each have a central angle $\Delta\epsilon(i)$ which is less than 60°, in particular less than 45° and in particular less than 30°.

In a further embodiment, the screw elements are characterized in that the evolvent curves E'(i) belonging to the points P(i) have constant central angles $\Delta\epsilon$.

In a further embodiment, the screw elements are characterized in that the points P(i) are located on a continuous curve which can be differentiated and has a constant curvature direction, and in a further embodiment the evolutes E draw the same curve at least in sections.

In a further embodiment, the screw elements are characterized in that the at least one outer contour section $A(\Delta\phi)$ is curved over the entire angle section $\Delta\phi$.

In a further embodiment, the screw elements are characterized in that the outer contour $A(\phi)$ has at least two outer contour sections $A(A(\phi_j)$ and $A(A(\phi_{j+1})$ and the at least two associated evolutes $E_j$ and $E_{j+1}$ are different.

In a further embodiment, the screw elements are characterized in that the outer contour $A(\phi)$ has a uniform direction of curvature.

The abovementioned cross-sectional profiles are preferably also two-flighted or three-flighted.

The generation of such cross-sectional profiles is described in detail in WO2011/039016 A and is thus known in principle to those skilled in the art.

The abovementioned screw elements are particularly preferably used in closely intermeshing multiscrew extruders such as, in particular, twin-screw extruders, preferably corotating twin-screw extruders.

The feature S2) can be satisfied by adhering to particular radial plays or spacings between the barrel holes $B_n$ and the screw elements of the screw, rotating in this barrel hole $B_n$ in a manner known per se by appropriate manufacture of the screw elements.

The radial plays can, as is known to those skilled in the art, be constant or, within the limits indicated, be variable. It is also possible to shift a screw profile within the radial plays. A person skilled in the art will know of methods of deriving a screw profile having plays according to the invention from a predetermined, precisely scraping screw profile. Methods known for this are, for example, the possibilities of axial spacing enlargement, longitudinal section equidistants and volume equidistants described in [1] on page 28 ff. In the case of axial spacing enlargement, a screw profile having a relatively small diameter is constructed and expanded by the absolute magnitude of the play between the screws. In the method of longitudinal section equidistants, the longitudinal section profile curve (parallel to the axis of rotation of the respective element) is shifted perpendicularly inward to the profile curve by half the screw element-screw element play in the direction towards the axis of rotation. In the method of volume equidistants, the screw element is reduced in size by half the screw to screw play in the direction perpendicular to the surfaces of the precisely scraping profile, proceeding from the volume curve on which the srew elements are cleaned. Preference is given to using the methods of longitudinal section equidistants and volume equidistants, particularly preferably volume equidistants, are preferably used.

Satisfying the feature S1) is a simple question of manufacture and adequately known to those skilled in the art.

Preferred materials of which the screw elements generally consist are steels, in particular nitriding steels, chromium steels, tool steels and stainless steels, and also powder-metallurgically produced metallic composites based on iron, nickel or cobalt. Further examples are nickel-based alloys and non-metallic materials such as ceramics.

The devolatilisation apparatus of the invention can also comprise a preextruder or prekneader installed upstream of the extruder, which are in each case configured as a devolatilisation extruder or devolatilisation kneader.

Such arrangements are known in principle from EP 2 353 839 A or PCT/EP2011/054415.

In one embodiment of the devolatilisation apparatus, the transition zone connecting the devolatilising preextruder or devolatilising prekneader and the (main) extruder can have at least one, preferably precisely one, depressurisation element such as, in particular, the above-described die plates.

In a further embodiment of the devolatilisation apparatus, the transition zone connecting the devolatilising preextruder or devolatilising prekneader and the (main) extruder can contain at least one pressure regulating unit, for example an orifice plate, by means of which the energy input into the preextruder or prekneader can then be controlled.

This two-stage structure of the devolatilisation apparatus enables a high devolatilisation performance combined with a high throughput of polymer-containing medium to be achieved.

If a devolatilising preextruder is used, the selected speed of rotation of this is typically high, since the energy input is low because of the (still) low viscosity of the polymer-containing medium to be devolatilised. The proportion of volatile compounds can in this way be considerably reduced before introduction into the (main) extruder.

One or more further concentrator units can be installed upstream of the devolatilising preextruder or devolatilising prekneader in order to increase the devolatilisation performance further.

Such concentrator units can be, for example, flash evaporators or cyclones which are adequately known from the prior art.

In one embodiment, a concentration unit comprises at least
- a heating device in combination with a devolatilisation tank, where the bottom part of the devolatisation tank is connected to a pump and the upper part of the devolatilisation tank is connected to at least one gas discharge line,
- a heating zone in combination with the pump of the concentration unit and the feed zone of the extruder or of the preextruder or of the prekneader.

In the context of the present invention, the term "in combination" refers to direct or indirect connections, with indirect connections being able to be effected, for example, via hoses or pipes.

The term "in combination" also allows for the option of further units or means being arranged between the units or means which are in combination.

Corresponding concentrator units are adequately known from WO2010/031823 A.

Further features, advantages and details of the invention may be derived below from the description of the examples.

The devolatilisation apparatus of the invention, including the embodiments thereof described above and below, is particularly suitable for use in a process for devolatilising polymer-containing media, and the invention therefore further provides a process for removing volatile compounds from a polymer-containing medium (PM) which contains at least one polymer and at least one volatile compound, which process comprises at least the following steps:
a) provision of a devolatilisation apparatus according to the invention,
b) introduction of the polymer-containing medium (PM) into the devolatilisation apparatus which is operated so that volatile compounds are given off from the polymer-containing medium (PM) through the devolatilisation openings of the devolatilisation unit and the polymer-containing medium (PM) is in this way depleted in volatile compounds and the polymer is isolated as product P from the polymer-containing medium on discharge from the devolatilisation apparatus and the product P then has a lower proportion of volatile compounds than the polymer-containing medium (PM) introduced into the devolatilisation apparatus and preferably has a total concentration of volatile compounds of less than 1% by weight, preferably less than 0.5% by weight, based on the mass of the polymer.

The polymer-containing medium PM, which is also referred to as cement, especially in the case of solutions of elastomers in organic solvents, contains, for example, from 3 to 98% by weight of a polymer and from 2 to 97% by weight of volatile compounds, in particular an organic solvent or an organic solvent and water, where the abovementioned components make up to 90-100% by weight, preferably from 95 to 100% by weight, of the total mass of the polymer-containing medium.

The organic solvent can, for example, be selected from the group consisting of linear or branched alkanes having from 4 to 10 carbon atoms, preferably from 4 to 7 carbon atoms. More preferred solvents are solvents containing or consisting of n-pentane, isopentane, n-hexane, cyclohexane, isohexane, methylcyclopentane, methylcyclohexane and n-heptane and also any mixtures comprising or consisting of these alkanes.

In one embodiment, the polymer-containing medium PM fed into the extruder contains, for example, from 30 to 98% by weight of a polymer and from 2 to 70% by weight of volatile compounds, in particular organic solvents or organic solvents and water, where the abovementioned components together make up from 90 to 100% by weight, preferably from 95 to 100% by weight, of the total mass of the polymer-containing medium.

The polymer-containing medium PM fed into the extruder preferably contains from 40 to 95% by weight of a polymer and from 5 to 60% by weight of volatile compounds, in particular organic solvents or organic solvents and water, where the abovementioned components together make up from 90 to 100% by weight, preferably from 95 to 100% by weight, of the total mass of the polymer-containing medium.

If the devolatilisation unit comprises a devolatilising preextruder, a devolatilising prekneader or a concentrator unit upstream of the extruder, the polymer-containing medium PM fed into the devolatilising preextruder, the devolatilising prekneader or the concentrator unit contains, for example, from 10 to 95% by weight of a polymer and from 5 to 90% by weight of volatile compounds, preferably from 15 to 80% by weight of a polymer and from 20 to 85% by weight of volatile compounds and particularly preferably from 15 to 70% by weight of a polymer and from 30 to 85% by weight of volatile compounds, where the volatile compounds are, in particular, organic solvents or organic solvents and water and the abovementioned components together make up from 90 to 100% by weight, preferably from 95 to 100% by weight, of the total mass of the polymer-containing medium.

It will be clear to a person skilled in the art that the content of volatile compounds in the polymeric medium PM on entry into the devolatilising preextruder or the devolatilising prekneader is lower than on entry into the downstream extruder. The same applies analogously to the content of volatile compounds in the polymeric medium PM on entry into a concentrator unit located upstream of a devolatilising preextruder or a devolatilising prekneader.

In this case, the polymer-containing medium PM fed into the concentrator unit preferably contains from 5 to 80% by weight of a polymer and from 20 to 95% by weight of volatile compounds, more preferably from 10 to 75% by weight of a polymer and from 25 to 90% by weight of volatile compounds, where the volatile compounds are, in particular, organic solvents or organic solvents and water and the abovementioned components together make up from 90 to 100% by weight, preferably from 95 to 100% by weight, of the total mass of the polymer-containing medium.

In an embodiment of the invention, the extruders can either be heated to temperatures of up to 300° C. or alternatively cooled via the barrels.

In a preferred embodiment, the extruder comprises means of operating separate zones independently at different temperatures, so that the zones can either be heated, unheated or cooled.

Preferred extruder materials should not be corrosive and should essentially prevent contamination of the polymer-containing medium of the product P with metal or metal ions.

Preferred extruder materials contain nitriding steel, duplex steel, stainless steel, alloys based on nickel, composites such as sintered metals, hot isostatically pressed materials, hard abrasion-resistant materials such as stellites, metals coated with coatings consisting of, for example, ceramic, titanium nitride, chromium nitride and diamond-like carbon (DLC).

The gas discharge lines of the devolatilisation zones can be connected to a condensation system and are preferably so connected.

In general, the purpose of the condensation system is to collect volatile compounds which are removed from the devolatilisation openings via the gas discharge lines and usually comprises a condenser and a vacuum pump. Any condensation system known from the prior art can be used for effecting the recovery of volatile compounds.

In general, the condensed volatile compounds are preferably, optionally after carrying out a phase separation to separate the volatile organic compounds from water, recirculated to a process for the preparation of polymer-containing media.

The devolatilisation apparatus can be followed by product processing apparatuses which preferably cool.

Cooling product processing apparatuses comprise all the apparatuses known to those skilled in the art for this purpose, for example pneumatic crumb conveyors with convective air cooling, vibrating crumb conveyors with convective air cooling, vibrating crumb conveyors having cooled contact surfaces, belt conveyors with convective air cooling, belt conveyors having cooled belts, water spray apparatuses and underwater pelletisation apparatuses in which the water functions as cooling medium.

The product P can then be processed further to final packaging and forward despatch. (Halo)butyl rubber is, for example, cooled to a temperature of or below 60° C., for example formed into bundles by means of a hydraulic press and then packed in cardboard or wooden boxes for despatch.

In general, an increased feed rate of the polymer-containing medium PM into the feed zone of the extruder requires a corresponding increase in the speed of rotation of the extruder. Furthermore, the speed of rotation determines the residence time of the polymer-containing medium PM. Thus, speed of rotation, feed rate and the extruder diameter are usually dependent on one another. The extruder is usually operated with the dimensionless throughput $V/n*d^3$ being set to from about 0.01 to about 0.2, preferably to from about 0.015 to about 0.1, where V is the volume flow rate, n is the speed of rotation expressed in revolutions per minute and d is the effective diameter of the extruder. The maximum and minimum feed rates and speeds of rotation are determined, for example, by the size of the extruder, the physical properties of the polymer present in the polymer-containing medium PM and the target values for the volatile compounds remaining in the polymer. However, the operating parameters can be determined by a person skilled in the art from these properties with the aid of a few initial experiments.

In an embodiment of the invention, the extruder is operated at a feed rate of from 5 to 25 000, preferably from 5 to 6000, kilograms per hour.

In general, the devolatilisation in the extruder and also in the preextruder or prekneader can be aided by addition of a stripping agent which is removed together with other volatile compounds. Even though this stripping agent can in principle be introduced anywhere in the extruder unit, addition outside the devolatilisation zones, e.g. in one or more pressure buildup zones or dispersion zones, is preferred.

Suitable stripping agents are substances which are inert towards the polymer-containing medium (PM) and have a vapour pressure of greater than 100 hPa at 100° C.

For the purposes of the invention, the term "inert" means that the stripping agent does not react chemically or does not appreciably react chemically with the polymers. Suitable stripping agents are nitrogen, carbon dioxide, noble gases, propane, butane, water or a mixture of the abovementioned substances. The amount of stripping agent can be from 0.0001 to 10% by weight, preferably from 0.001 to 5% by weight and more preferably from 0.1 to 2% by weight, based on the amount of polymer obtained at the discharge zone of the extruder.

The invention will be illustrated by way of example below with the aid of the figures, but without being restricted thereto.

The following conventions apply to FIGS. 2a, 2b, 2c and 2d: the coordinates x and y have their origin at the point of rotation of one of the screws. All angles indicated are in radians. All other measurements indicated are normalised to the spacing of the axes and are represented by upper case letters: A=a/a; Rj=r/a; RA=ra/a; etc.

Furthermore:
RG=normalised barrel radius,
RA=normalised outer radius of the profile,
RF=normalised outer radius of the screw to be manufactured,
S=normalised play between the screws (gap),
D=normalised play of the screw to the barrel.

Figure 2A:
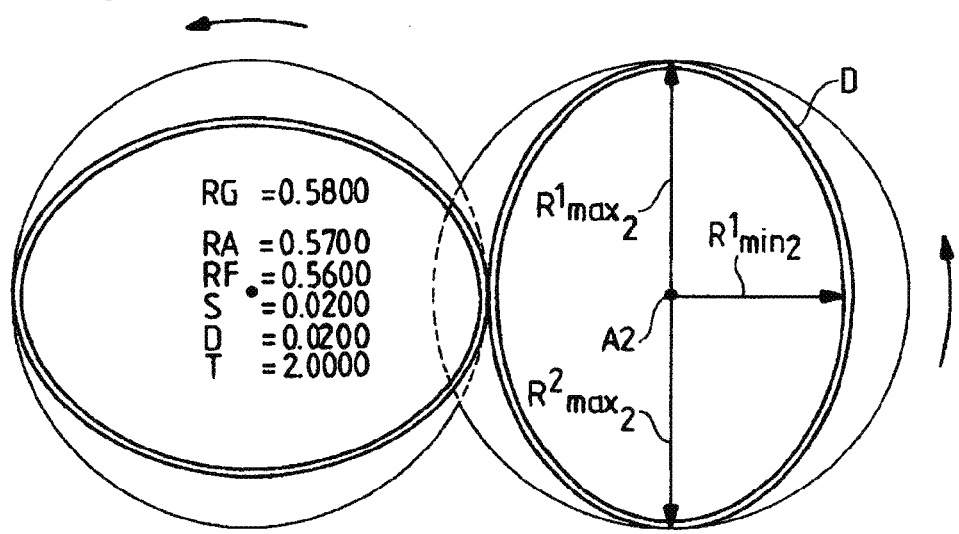
FIGS. 2a, 2b, 2c and 2d show continually integratable screw profiles which satisfy at least the feature S3).
Figure 2B:
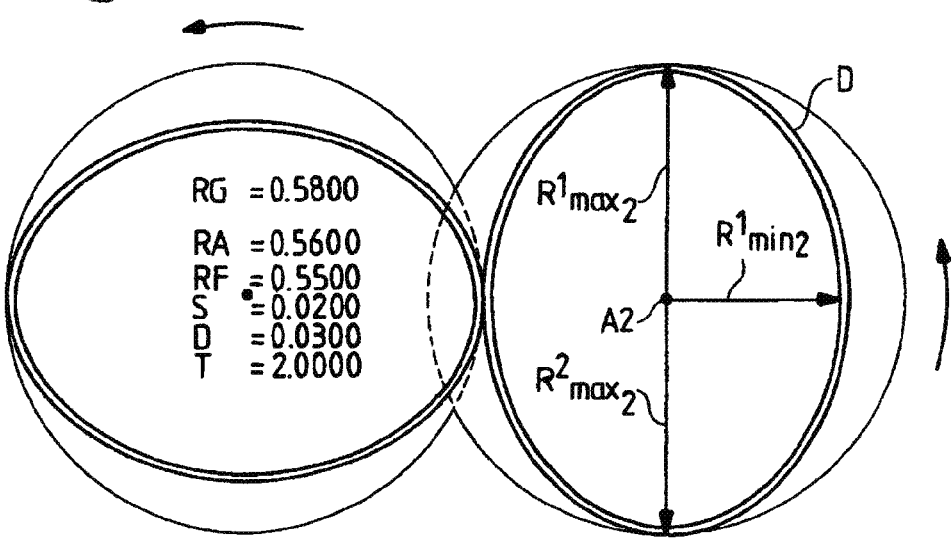
Figure 2C:
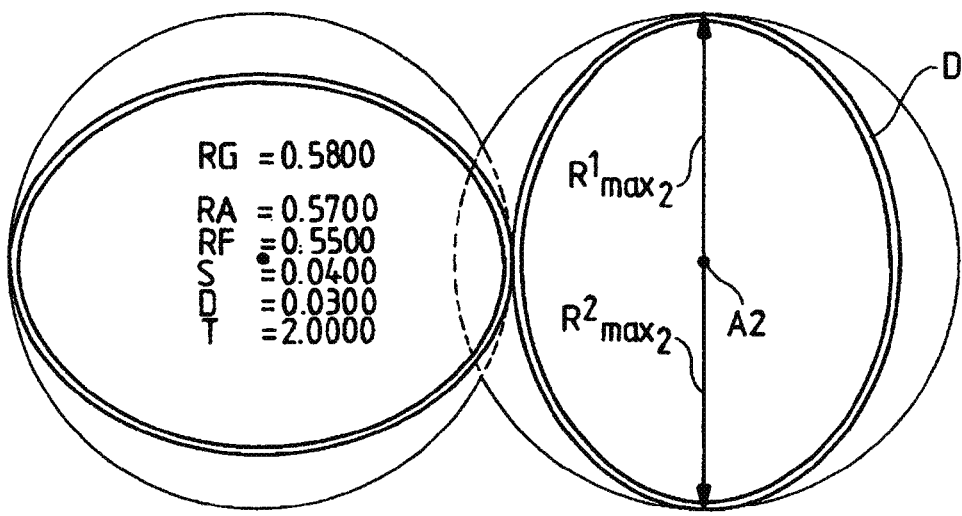
Figure 2D:
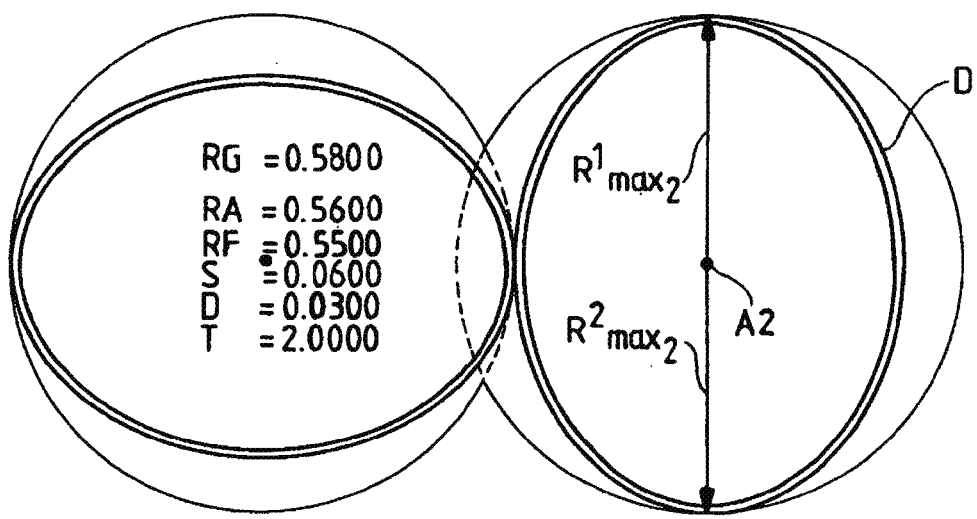

FIGS. 2a, 2b, 2c and 2d show examples of profiles of screw elements used according to the invention with plays which are according to the invention. In FIG. 2a, the gap S in the mutual cleaning of the screws was selected so as to be the same as the gap D in the cleaning of the barrel. In FIG. 2b, the gap S is smaller than D and in FIGS. 2c and 2d, D is, conversely, smaller than S.

Figure 3:
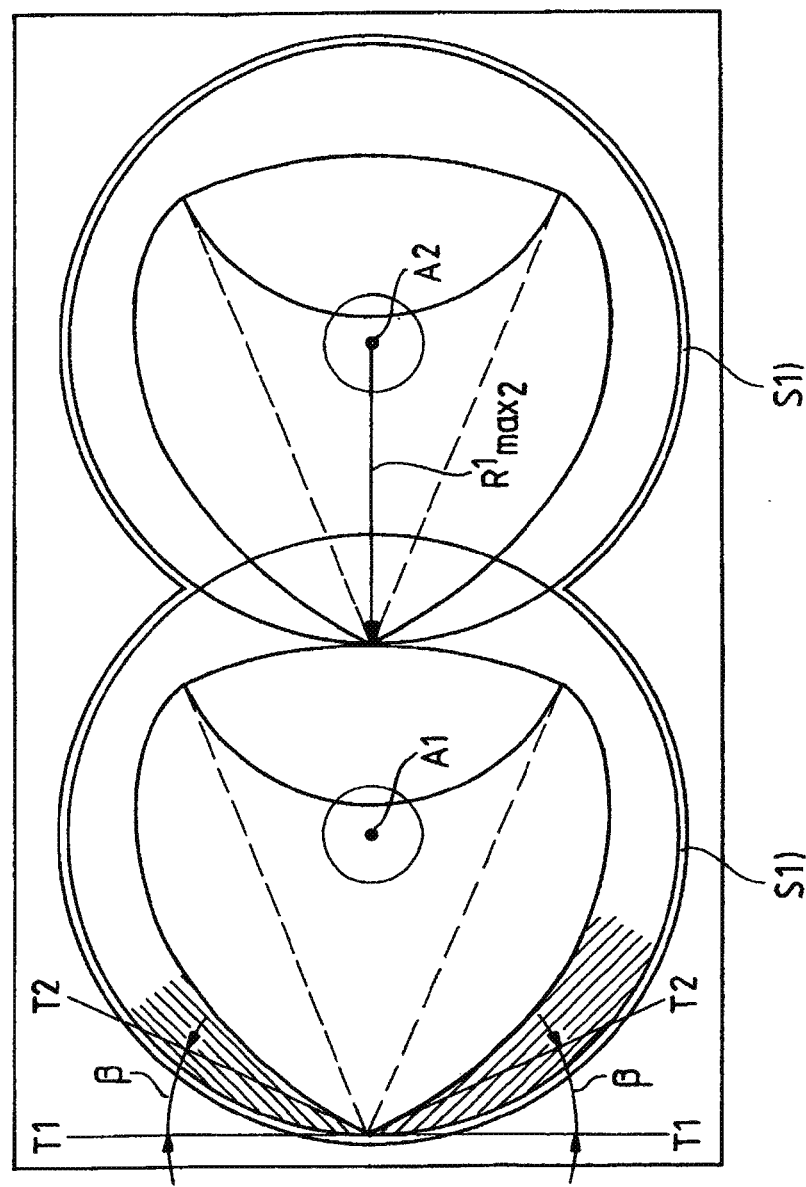

FIG. 3 depicts a screw element which satisfies the features S3) and S1).

The construction of the profile as such is disclosed in WO2011/039016, especially in FIG. 26 and the associated description. However, the radial maxima $R^1_{max}$, $R^2_{max}$ and $R^3_{max}$ relative to the diameter of the barrel holes D1 and D2 were reduced so that the radial plays of the feature S1) were obtained. The radius $R_{max}$ in this case is 0.96 of the barrel diameter.

Figure 4:
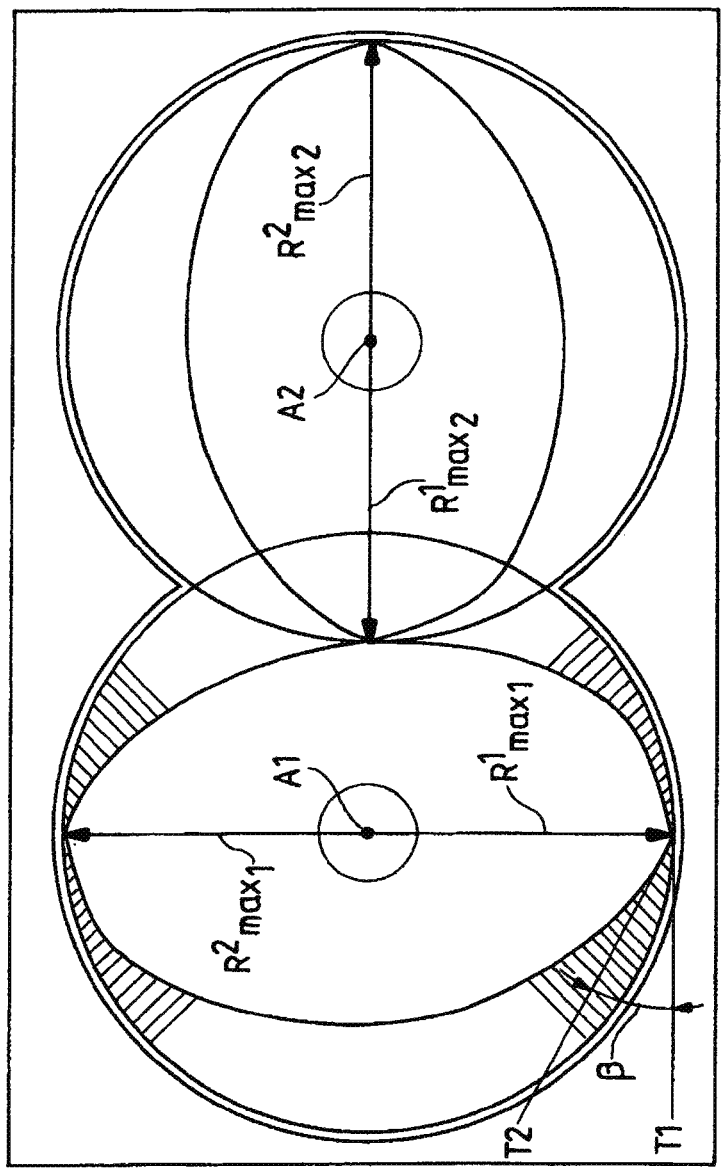

FIG. 4 depicts a screw element which satisfies the features S3) and S1).

The construction of the two-flighted profile as such is likewise disclosed in WO2011/039016, especially in FIG. 22 and the associated description. However, the radial maxima $R^1_{max}$ and $R^2_{max}$ relative to the diameter of the barrel holes D1 and D2 were reduced so that the radial plays of the feature S1) were obtained. The radius $R_{max}$ is in this case 0.96 of the barrel diameter.

Both in FIG. 3 and in FIG. 4, the relative maximum forming an edge, which at the same time in each case represents an absolute maximum, has degenerated to a relative point maximum, so that the tangential angle b obtained for these points remains outside consideration since the points by definition are not assigned to the active flank $F_{akt}$.

Figure 5:
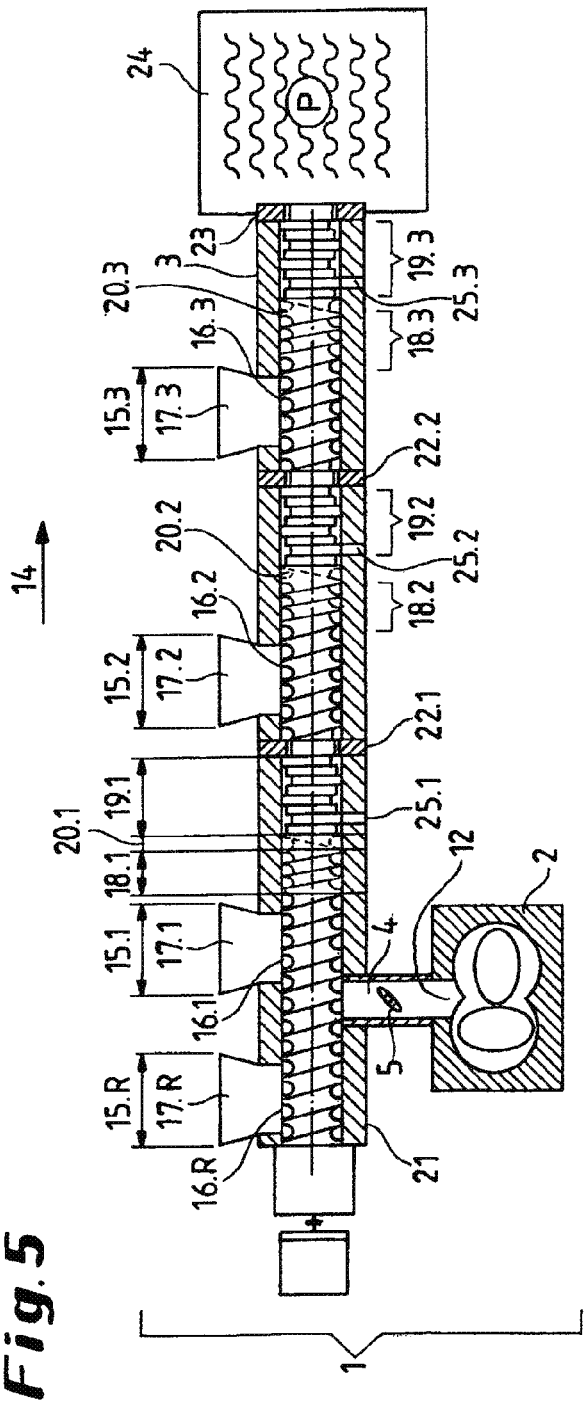

FIG. 5 depicts the extruder of a devolatilisation apparatus according to the invention in longitudinal section and the upstream prextruder in cross section.

Figure 6:
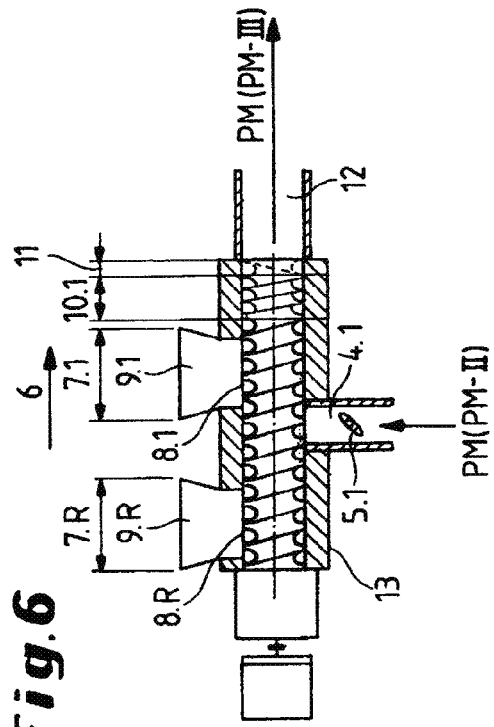

FIG. 6 shows the preextruder located upstream of the extruder in longitudinal section.

The following examples are illustrated with the aid of FIGS. 5 and 6.

EXAMPLES

Analytical Methods

Water content of polymer-containing media PM: The sample was introduced into a centrifuge and centrifuged at 4000 rpm at room temperature for 5 minutes. The water was then collected at the bottom of the ampoule and weighed.

Total concentration of volatile compounds: A sample of the product (P) was cut into small pieces having a size of 2×2 mm. About 30 g of the product were introduced into an aluminium pot. The weight of the pot and of the product were determined exactly. The pot with the sample of the product was then placed in a vacuum oven at a vacuum of 130 hPa at a temperature of 105° C. for 60 minutes. After drying, the pot was placed in a desiccator and allowed to cool for 30 minutes. The pot was then weighed again. The weight loss was determined.

Residual solvent content in product P: The residual solvent content in the product P was determined by head-space gas chromatography. 0.5±0.005 g of the sample was weighed out and introduced into a head-space ampoule and a measured amount of solvent (1,2-dichlorobenzene, ODCB) was added. The ampoule was closed and shaken until the product had dissolved. The ampoule was heated until the volatile organic compounds had equilibrated between the sample and the gas phase in the ampoule (head-space). Part of the head-space gas was injected into a stream of carrier gas which conveyed the sample along a chromatography column. Standards of known composition were used for calibrating the GC. Toluene was added to the solvent for use as internal standard.

Residual water content in the product P: The total amount of volatile compounds is the sum of water, solvents and other volatile compounds. Since the proportion of other volatile compounds such as monomers was usually less than 0.0005% by weight in the cases examined, the residual water content could be determined by subtracting the solvent content from the total content of volatile compounds.

The solvent content in the polymer-containing media PM was measured by means of gas chromatography. The internal standard was isooctane. The sample was diluted with toluene and then injected into the gas chromatograph. The gas chromatography was carried out on an HP 6890 chromatograph having the following specifications:
 column type DB-5 from J&W, length 60 m, diameter 0.23 mm, film thickness 1.0 μm
 Injector temp.: 250° C.
 Detector temp.: 350° C.
 Carrier gas: helium
 Column pressure: 96 kPa
 Detector. FID The following polymer-containing media PM were used for the examples below:

Preparation of PM-I

A crude bromobutyl rubber solution was obtained from a commercial production plant and the organic phase was separated from the aqueous phase volume. The separation of the aqueous phase from the organic phase is known from WO2010/031823 A, in particular FIG. 7 and the associated description. The organic phase was then used as PM-I for carrying out the experiment. PM-I contained about 23% by weight of bromobutyl rubber, about 74% by weight of hexane isomers and 3% by weight of water, calculated on the basis of 100% by weight of these three components. (The concentration of the additives based on the bromobutyl rubber fraction was:
 ESBO: from 1 to 1.6 phr, calcium stearate: from 1.3 to 1.7 phr and Irganox: from 0.03 to 0.1 phr The bromobutyl rubber obtained from PM-I had the following properties after extrusion:
 Mooney (ML 1+8, 125° C.) from 28 to 36, content of bound bromine from 1.6 to 2.0% by weight.

Example 1

Preconcentration

The Concentrator Unit

Figure 1:
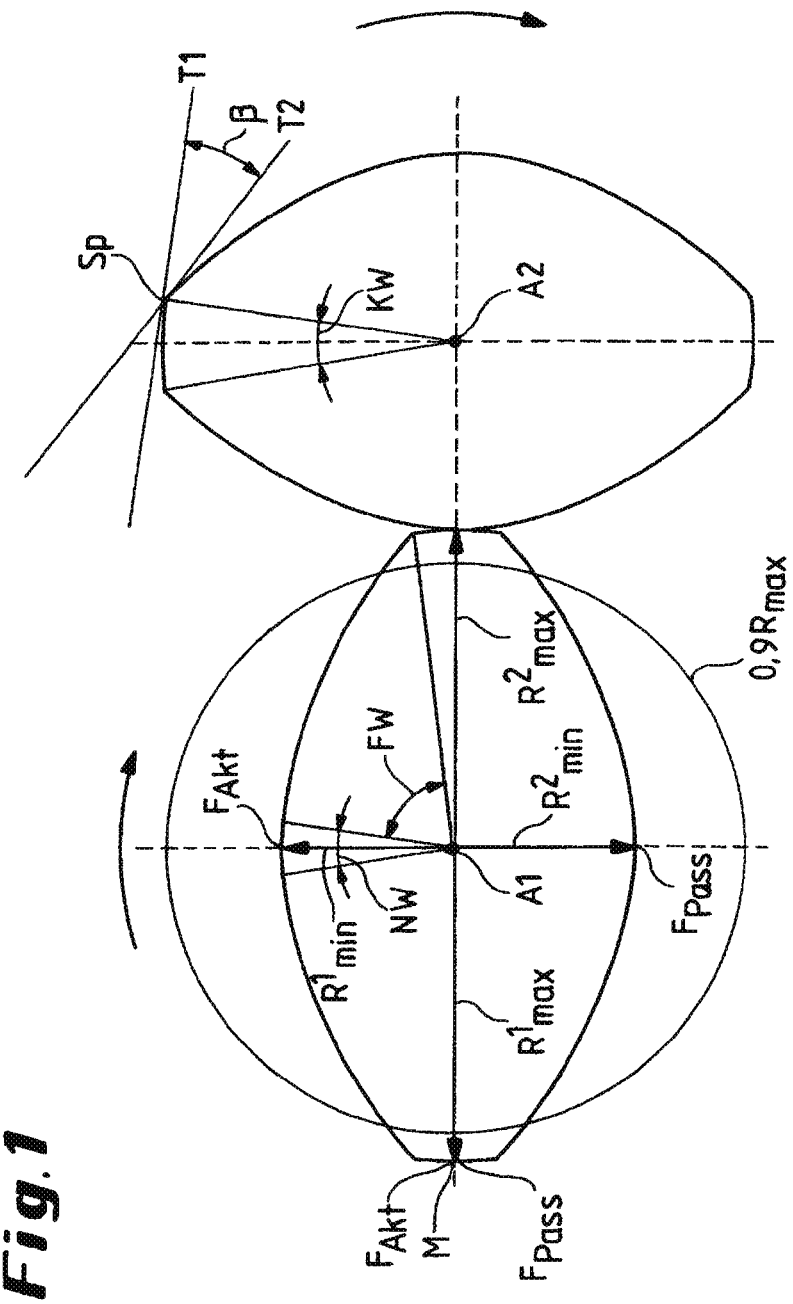
FIG. 1 shows a conventional two-flighted Erdmenger screw profile having the geometric test criteria as described in detail at the outset.

The concentrator unit used for the examples was similar to that depicted in WO2010/031823 A, in particular FIG. 1. A gear pump was used for pumping the polymer-containing medium PM-I which had been prepared as described above to the heating device. The heating device was a shell-and-tube heat exchanger. A plurality of tubes which can be heated internally by means of steam are in this case accommodated in an outer tube serving as the shell, which at the same time accommodates the product. In addition, mixing elements are provided on the outside of the internal tubes which are in contact with the product in order to ensure good heat transfer. The heating medium was steam, the flow of which could be regulated according to the temperature set for the medium. A pressure release valve was installed upstream of the concentrator unit, and the pressure upstream of the valve was controlled automatically to a set value. This set value was selected so that boiling of the heated polymer-containing medium PM-I in the heating device was prevented. The heated polymer-containing medium PM-I was passed from the top into the devolatilisation tank. The conical output of the devolatilisation tank was equipped with a gear pump. The gear pump had the advantage that it was able to handle high viscosities and build up high pressures. Samples were taken from the concentrated polymer-containing medium PM-II in order to examine the concentration after the concentration stage.

Example 1

The heating medium of the heating device was set to 160° C., so that the polymer-containing medium PM-I was heated to a temperature of 135° C. The pressure in the devolatilisation tank was atmospheric. For the present purposes, atmospheric pressure means that the vaporised volatile constituents from the devolatilisation tank were conveyed through a condenser. The condenser was cooled by means of water and the condensed liquid constituents flowed into a collection vessel which was connected directly to the environment. As a result, virtually ambient pressure was established in the devolatilisation tank. The concentrated polymer-containing medium PM-II at the output of the devolatilisation tank could be conveyed from the concentrator unit by means of the extraction pump as described above. The concentrated polymer-containing medium PM-II had a hexane concentration of about 43% by weight.

The Devolatilisation Apparatus (1)

The preconcentrated PM-II was conveyed via a heating device into the devolatilisation apparatus (1). The heating device was a heat exchanger of the same construction as was also used in the concentrator unit. The devolatilisation apparatus comprised a preextruder (2), a contrarotating twin-screw extruder having a hole diameter of D1=D2=57 mm and an effective length of 720 mm, and a main extruder (3), a corotating twin-screw extruder having a hole diameter of D1=D2=58.3 mm and an effective length of 3225 mm. Effective length in this case means the length over which contact with the product takes place.

Both extruders of the devolatilisation apparatus comprised a regulating valve (5 or 5.1) as a pressure control device upstream of the respective feed zones (4 and 4.1) of the extruder or of the preextruder.

The preextruder had a devolatilisation zone (7.1) downstream of the feed zone (4.1) of the preextruder (6) and a devolatilisation zone (7.R) upstream of the feed zone (4.1) of the preextruder (6). The devolatilisation zone (7.R) had a devolatilisation opening (8.R) with devolatilisation dome (9.R) which was connected to a gas discharge line, and the devolatilisation zone (7.1) had a devolatilisation opening (8.1) with devolatilisation dome (9.1) which was connected to a gas discharge line. Downstream of the devolatilisation zone (7.1) of the preextruder (6) there was a pressure buildup zone (10.1) and a banking-up element (11). Downstream of the banking-up element (11), a transfer zone (12) led to the main extruder (3). The transfer zone (12) comprised a heatable tube which opened into the inlet of the regulating valve (5) which in turn marked the beginning of the feed zone (4) of the main extruder (3).

The gas discharge lines of the preextruder (2) were connected to an extraction and condenser unit. The gases were extracted by means of a vacuum pump from where the compressed gases were fed into a water-cooled condenser. The barrel (13) of the preextruder was configured so as to be able to be heated by means of steam.

The main extruder had three devolatilisation zones (15.1, 15.2 and 15.3) located downstream of the feed zone (4) of the extruder (14) and one devolatilisation zone (15.R) located upstream of the feed zone (4) of the extruder (14). The devolatilisation zone (15.R) had a devolatilisation opening (16.R) with devolatilisation dome (17.R) which was connected to a gas discharge line, and the devolatilisation zones (15.1, 15.2 and 15.3) each had a devolatilisation opening (16.1, 16.2 and 16.3) with devolatilisation dome (17.1, 17.2 and 17.3) which was in each case connected to a gas discharge line. The gas discharge lines were connected to a condenser unit comprising a mechanical vacuum pump and a downstream water-cooled condenser. The gas discharge lines were connected to a condenser unit comprising two mechanical vacuum pumps connected in series and a downstream water-cooled condenser.

Downstream of the devolatilisation zone (15.1) of the extruder (14) there was a pressure buildup zone (18.1) and downstream of this there was a first dispersing zone (19.1).

Downstream of the devolatilisation zones (15.2 and 15.3) of the extruder (14) there was in each case likewise a pressure buildup zone (18.2 and 18.3). Downstream of the pressure buildup zones (18.2 and 18.3) there was in each case a dispersion zone (19.2 and 19.3). Between the pressure buildup zones (18.1, 18.2 and 18.3) and the dispersion zones (19.1, 19.2 and 19.3), there was in each case a banking-up element (20.1, 20.2 and 20.3), and downstream of the dispersion zones (19.1 and 19.2) of the extruder (14) there was in each case a divided sieve disc pair (22.1 and 22.2) removably fastened in the barrel (21).

Downstream of the last pressure buildup zone (18.3) of the extruder (14) there was the discharge zone (23) from the extruder. This discharge was formed by a fixed die plate which opens into an underwater pelletization device (24). Between the pressure buildup zone of the extruder (18.3) and the die plate of the pelletizer (23), there was a start-up valve which allows the product to be extruded via a bypass into a collection vessel provided instead of the product being conveyed through the die plate to the underwater pelletizer. This bypass is used, in particular, for starting-up and shutting-down the extrusion apparatus.

In the region of the dispersion zones (19.1, 19.2 and 19.3), the extruder had inlet openings (25.1, 25.2 and 25.3) for the introduction of stripping agents.

The barrel was made up of a plurality of parts and configured so that it could be divided into three independently heated or cooled zones in order to at least partially control the temperature profile in the extruder. Heating and cooling were effected by means of steam and cooling of water, respectively.

The treatment elements used for the devolatilisation, pressure buildup and dispersion zones and their specification are indicated in the following examples.

Example 2

The preconcentrated polymer-containing medium PM-II obtained from Example 1 was fed via a heating device into the devolatilisation apparatus at a rate of 180 kg/h, resulting in about 80 kg/h of devolatilised dry product at the discharge zone (24) of the devolatilisation apparatus. The steam supply to the heating device was set so that the temperature of PM-II at the regulating valve (5.1) was about 110° C. The pressure at the regulating valve was set to 1.3 MPa. The pressure in the two zones of the preextruder was set to 400 mbar absolute. The heating temperature in the heatable parts of the barrel (13) of the preextruder was about 160° C. At the beginning of the transfer zone (4), the rubber content of the further-concentrated polymer-containing medium PM-II was about 80% by weight. PM-II was then introduced at a temperature of 100° C. and a pressure of about 2.0 MPa into the main extruder (3) in the feed zone (4). The pressure at the transfer zone was obtained with the pressure control device at the feed zone of the main extruder completely opened.

Examples 3 to 6

The further-concentrated product PM-III obtained as described in Example 1 and Example 2 was introduced into the main extruder (3) in which different screw elements were used in the devolatilisation zones and dispersing zones.

The devolatilisation zone (15.R) and the devolatilisation zone (15.1) were operated at an absolute pressure of about 100-180 mbar. The pressure in the devolatilisation zones (15.2 and 15.3) was in each case set to about 50 mbar absolute. From an engineering point of view, it is difficult to keep a reduced pressure exactly constant in such a process, and there are therefore fluctuations which even out over the course of the experiment.

Nitrogen was introduced as stripping agent into the dispersing zone (19.1) downstream of the devolatilisation zone (15.1) at a rate of 0.5-0.6 kg/h.

A dispersion composed of water and calcium stearate (45% by weight of calcium stearate) was introduced at a rate of 3.6 kg/h into the dispersing zone (19.2) downstream of the devolatilisation zone (15.2).

A dispersion composed of water and calcium stearate (45% by weight of calcium stearate) was introduced at a rate of 3.6 kg/h into the dispersing zone (19.3) downstream of the devolatilisation zone (15.3).

The speed of rotation of the extruder screws of the main extruder was in the range from 60 min$^-$ to 90 min$^-$.

The screw elements used in the respective examples are summarised in Table 2a).

TABLE 2a

Screw elements used

| Example | Devolatilisation zones 15.1, 15.2 and 15.3 | Dispersion zones 19.1, 19.2 and 19.3 |
|---|---|---|
| 3 | two-flighted standard Erdmenger profile analogous to FIG. 1 | Kneading blocks & eccentric discs |
| 4 | two-flighted standard Erdmenger profile analogous to FIG. 1 | Kneading blocks & eccentric discs |
| 5 | two-flighted screw element with a profile which can be continually differentiated analogous to FIG. 2b | two-flighted screw element with a profile which can be continually differentiated analogous to FIG. 2b |
| 6 | two-flighted standard Erdmenger profile analogous to FIG. 1 | two-flighted standard Erdmenger profile analogous to FIG. 3 |

TABLE 2b

Pitch t and gap measurements

| Example | Devolatilisation zones 15.1, 15.2 and 15.3 |
|---|---|
| 3 | $R^1_{max\ n} = R^2_{max\ n} = 0.496\ D_n$, t = 1.37 $D_n$ |
| 4 | $R^1_{max\ n} = R^2_{max\ n} = 0.474\ D_n$, t = 1.37 $D_n$ |
| 5 | $R^1_{max\ n} = R^2_{max\ n} = 0.479\ D_n$, t = 2.06 $D_n$ |
| 6 | $R^1_{max\ n} = R^2_{max\ n} = 0.474\ D_n$, t = 2.06 $D_n$ |

TABLE 2c

Results

| Example | Hexane content in the product P [ppm by weight] | Total volatile substances incl. water [% by weight] |
|---|---|---|
| 3 (for comparison) | 2900 | <0.30 |
| 4 (for comparison) | 3000 | <0.30 |
| 5 | 450 | <0.30 |
| 6 | 500 | <0.30 |

The following can be seen from the examples:

In Example 3, none of the conditions S1), S2) or S3) is satisfied and the devolatilisation result is unsatisfactory.

In Example 4, only the condition S1) is satisfied and the devolatilisation result is unsatisfactory.

In Example 5, all conditions S1), S2) and S3) are satisfied and the devolatilisation result is very good.

In Example 6, the conditions S1) and S2) are satisfied and the devolatilising result is likewise very good.

What is claimed is:

1. A devolatilisation apparatus comprising at least one extruder, the extruder comprising:
   a barrel and n barrel holes $B_n$ having associated hole diameters $D_n$ where n is an integer,
   one or more screws $W_n$ arranged concentrically in each of the barrel holes $B_n$ and configured to be rotatable within the barrel holes, wherein each screw has an axis of rotation $A_n$ and is equipped with treatment elements, the treatment elements having a cross-sectional profile orthogonal to the axis of rotation, wherein the cross-sectional profile in a circumferential direction has:
   m relative maxima $R^m_{max\ n}$ in respect of a radial dimension of the cross-sectional profile to the axis of rotation $A_n$ of the screw $W_n$, where m is an integer from 1 to 8,
   a maximum value $R_{max\ n}$ in respect of radial dimension of the cross-sectional profile to the axis of rotation $A_n$ of the screw $W_n$, where $R_{max\ n}$ fulfils:

$R_{max\ n} <= (D_n/2)$ at least one feed zone,
   one or more devolatilisation zones comprising in each case at least one devolatilisation opening which is suitable for discharge of volatile constituents from a polymer-containing medium from the extruder,
   at least one discharge zone, and
   wherein the treatment elements comprise screw elements having a pitch t, and the screw element are configured so that each of the following three conditions are met:
   S1) the cross-sectional profile has at least one relative maximum $R^m_{max\ n}$ based on the radial dimension of the profile curve, for which:

$0.420\ D_n < R^m_{max\ n} < 0.490\ D_n$,

S2) $1.38\ D_n < t < 5.00\ D_n$, and
   S3) the cross-sectional profile of the respective screw element has no tangential angle β greater than 30°, on the active flanks located at the front in the direction of rotation in the range of the radial dimension from 0.95 $R_{max}$ to $R_{max}$, where the tangential angle β is defined as
      a smaller of the two angles formed on drawing tangents at any point on the cross-sectional profile of the treatment element at which the cross-sectional profile cannot be continually differentiated, and
      is 0° at any point on the cross-sectional profile of the treatment element at which the cross-sectional profile can always be differentiated.

2. The devolatilisation apparatus according to claim 1, wherein:
   the extruder comprises at least one of a single-screw extruder and a multiscrew extruder; and
   the screw elements SE have a modular construction and comprise a core shaft and screw elements which have an accommodation opening for the core shafts or are configured as screws having a solid construction or as screws comprising individual subsegments and produced in solid construction.

3. The devolatilisation apparatus according to claim 1, wherein n=2 to 8, and the barrel holes pass through opposite one another and are arranged parallel to one another.

4. The devolatilisation apparatus according to claim 1, wherein n=2, and the barrel holes $B_n$ pass through and are arranged parallel to one another.

5. The devolatilisation apparatus according to claim 1, wherein:
   for $R^m_{max\ n}$, m is 2,
   for S1), $0.450\ D_n < R^m_{max\ n} < 0.480\ D_n$,
   for S2), $1.90\ D_n < t < 2.40\ D_n$, and
   for S3), the cross-sectional profile of the respective screw element has no tangential angle β greater than 10° on the active flanks located at the front in the direction of rotation in the entire range of the radial dimension from 0 to $R_{max}$.

6. The devolatilisation apparatus according to claim 1, wherein:

the extruder has at least one dispersing zone; and the devolatilisation apparatus comprises 1 to 20 devolatilisation zones, the devolatilisation zones, in the transport direction of the extruder, define a last devolatilisation zone, and at least the last devolatilisation zone is equipped with screw elements SE.

7. The devolatilisation apparatus according to claim 6, wherein the devolatilisation apparatus comprises 2 to 8 devolatilisation zones, at least one devolatilisation zone is located upstream of the feed zone of the extruder, and ail of the devolatilization zones are equipped with screw elements SE.

8. The devolatilisation apparatus according to claim 1, wherein the devolatilisation openings comprise devolatilisation domes, and the devolatilisation openings and devolatilisation domes are configured for preventing or reducing exit of polymer-containing medium therethrough.

9. The devolatilisation apparatus according to claim 1, wherein surfaces within the devolatilisation openings comprise coatings which reduce or prevent adhesion of material being devolatilised to the surface.

10. The devolatilisation apparatus according to claim 1, wherein the extruder comprises:
one or more feed openings for the introduction of additives; and
at least one depressurisation element located upstream of at least some of the devolatilisation zones of the extruder.

11. The devolatilisation apparatus according to claim 10, wherein the depressurisation elements comprise perforated plates, and the perforated plates are made up of a plurality of parts so that they can be taken from the barrel without removal of the screws from the barrel.

12. The devolatilisation apparatus according to claim 1, wherein;
the screw elements SE are two-flighted or three-flighted; and
the screw elements SE have a cross-sectional profile represented completely by a profile curve which can he continually differentiated.

13. The devolatilisation apparatus according to claim 12, wherein the screw elements SE are unsymmetrical or symmetrical.

14. The devolatilisation apparatus according to claim 1, wherein the screw elements SE have
a longitudinal axis M*,
a core radius Rj and an outer radius $R_a$ in which each have the longitudinal axis M* as midpoint,
an outer contour A(ϕ) running around the longitudinal axis M*, where ϕ is the angle around the longitudinal axis M*, and
$R_j < D_A((P)) < R_a$ for a spacing $D_A((p))$ of the outer contour A(ϕ) from the longitudinal axis M,
and further wherein
the outer contour A(ϕ) has at least one outer contour section A(Δϕ) which runs along an angular section Δϕ and has a continually changing spacing $D_A(Δϕ)$ from the longitudinal axis M*, where $Rj < D_A(Δϕ) < R_a$, and
has an associated evolute E,
which is a number of n points P(i) where i=1 to n and n>3,
where each of the points P(i) is located outside the longitudinal axis M* and within the outer radius $R_a$, and
each two adjacent points P(i) and P(i+1) have a spacing Δr(i) from one another which is less than $R_j/2$.

15. The devolatilisation apparatus according to claim 1, wherein the screw elements SE are made of steel or powder-metallurgically produced metallic composites based on iron, nickel or cobalt.

16. The devolatilisation apparatus according to claim 1, further comprising;
one or more concentrator units located upstream of the extruder; and
a devolatilisation extruder or devolatilisation kneader located upstream of the extruder.

17. The devolatilisation apparatus according to claim 16, further comprising a transfer zone connecting the devolatilising preextruder or devolatilising prekneader and the extruder, wherein the transfer zone has at east one depressurisation element.

18. The devolatilisation apparatus according to claim 17, wherein the transfer zone has one depressurisation element and further comprises at least one pressure regulating unit.

* * * * *